US007031930B2

(12) United States Patent
Freeman et al.

(10) Patent No.: US 7,031,930 B2
(45) Date of Patent: Apr. 18, 2006

(54) PROJECT MANAGEMENT FOR COMPLEX CONSTRUCTION PROJECTS BY MONITORING SUBCONTRACTORS IN REAL TIME

(75) Inventors: Darlene M. Freeman, Yardley, PA (US); Mark Halverson, Belle Meade, NJ (US); Stacy Lewis, Holland, PA (US); Bronwyn Fiely-Fisher, South Belmar, NJ (US)

(73) Assignee: General Electric Capital Corporation, Stamford, CT (US)

( * ) Notice: Subject to any disclaimer, the term of this patent is extended or adjusted under 35 U.S.C. 154(b) by 858 days.

(21) Appl. No.: 09/750,350

(22) Filed: Dec. 29, 2000

(65) Prior Publication Data

US 2002/0087381 A1 Jul. 4, 2002

(51) Int. Cl.
*G06F 17/60* (2006.01)
(52) U.S. Cl. ........................................ 705/9
(58) Field of Classification Search .................. 705/8, 705/9
See application file for complete search history.

(56) References Cited

U.S. PATENT DOCUMENTS 5,893,074 A * 4/1999 Hughes et al. ................. 705/8

OTHER PUBLICATIONS

"Primavera Introduces Primavera Expedition 7.0." PR Newswire, page NA, Apr. 19, 2000.*

* cited by examiner

*Primary Examiner*—Susanna M. Diaz
(74) *Attorney, Agent, or Firm*—Buckley, Maschoff & Talwalkar LLC (57) ABSTRACT

A method and system for managing complex construction projects by monitoring subcontractors in real time. Whenever a subcontractor realizes a need for a change in specification or anticipates any other reason that might delay completion of construction as scheduled, the subcontractor selects from a computerized menu the appropriate new status for the subcontractor's task and provides other information relevant to the changed situation. The status change is displayed on a display device, an electronic dashboard, so as to be easily noticed, the dashboard also providing one-click links to a display showing how widespread are the problems and a display for on-line review and approval of the status change by a manager or engineer in charge of the project, who notes the status change on the display and with whatever input may be provided by the other persons notified of the status change, decides the best course of action to keep the construction on schedule.

15 Claims, 7 Drawing Sheets

SATELLITE PROGRAM SUMMARY— FOR EXAMPLE ONLY/DOES NOT REPRESENT PROGRAM STATUS

—CLASS-1 AND CLASS-2 CHANGES BY SUB-SYSTEM—

| PROGRAMS UNDER CONSTRUCTION | MANUFACTURER | SCHEDULED SHIP DATE | SCHEDULED LAUNCH DATE | PAYLOAD | TT&C | POWER | PROPULSION | NOTES |
|---|---|---|---|---|---|---|---|---|
| GE-6 | LM | 9/18/00 | 10/21/00 | | | | | |
| GE-8 | LM | 10/22/00 | 12/21/00 | | | | | |
| GE-9 | LM | Undefined | Undefined | | | | | |
| GE-12 | Alcatel | 5/5/02 | 2Q02 | | | | | |
| GE-14 | Alcatel | 9/5/02 | 4Q02 | | | | | |
| GE-999 | LM | ///// | ///// | C2-CHANGE | | ///// | | |
| GE-15 | LM | 12/2/02 | 4Q02 | | | | | |
| GE-16 | LM | 7/30/03 | 3Q03 | | | | | |
| GE-1i | Alcatel | 1/10/03 | 1Q03 | | | | | |
| GE-2i | Alcatel | 3/11/03 | 2Q03 | | | | | |
| GE-3i (6-Mo Call Up) | Alcatel | 10/17/03 | 4Q03 | | | | | (Option) |
| GE-4i (6-Mo Call Up) | Alcatel | 12/15/03 | 1Q04 | | | | | (Option) |

| NO CHANGE |
| CLASS 2 CHANGE |

FIG.3

| SATELLITE PROGRAM SUMMARY –GE8 | | | | | | | |
|---|---|---|---|---|---|---|---|
| | PAYLOAD | TT&C | GNAC | POWER | POPULATION | NOTES | |
| SUBCONTRACTOR–1 | | | | | | | |
| SUBCONTRACTOR–2 | CLASS 2 CHANGE (SHOR DESCRIP OF CHANGE) | | | | | | |
| SUBCONTRACTOR–3 | | | | | | | |
| SUBCONTRACTOR–4 | | | | | | | |

| NO CHANGE |
|---|
| CLASS 2 CHANGE |

ON LINE REVIEW & APPROVAL

FIG.4

| SUMMARY OF SUBCONTRACTOR PERFORMANCE ALL PROGRAMS - AS OF //** | | | | | |
|---|---|---|---|---|---|
| | GE-6 | GE-6 | GE-XXX | GE-12 | GE-14 |
| SUBCONTRACTOR-1 | | | | | |
| SUBCONTRACTOR-2 | | | | ALERT | ALERT |
| SUBCONTRACTOR-3 | ← | | ▨ | | |
| SUBCONTRACTOR-4 | | | | | |
| SUBCONTRACTOR-5 | | ← | ▨ | | |
| SUBCONTRACTOR-6 | | | | | |
| SUBCONTRACTOR-7 | | | | | |
| SUBCONTRACTOR-8 | | | | | |
| SUBCONTRACTOR-9 | | | | | |

SUBCONTRACTOR EARLY ALERT

SATELLITE PROGRAM SUMMARY – FOR EXAMPLE ONLY/DOES NOT REPRESENT PROGRAM STATUS

— CLASS-1 AND CLASS-2 CHANGES BY SUB-SYSTEM —

| PROGRAMS UNDER CONSTRUCTION | MANUFACTURER | SCHEDULED SHIP DATE | SCHEDULED LAUNCH DATE | PAYLOAD | TT&C | POWER | PROPULSION | NOTES |
|---|---|---|---|---|---|---|---|---|
| GE-6 | LM | 9/18/00 | 10/21/00 | | | | | |
| GE-8 | LM | 10/22/00 | 12/21/00 | | | | | |
| GE-9 | LM | Undefined | Undefined | | | | | |
| GE-12 | Alcatel | 5/5/02 | 2Q02 | | | | | |
| GE-14 | Alcatel | 9/5/02 | 4Q02 | | | | | |
| GE-999 | LM | | | C2-CHANGE | | | | |
| GE-15 | LM | 12/2/02 | 4Q02 | | | | | |
| GE-16 | LM | 7/30/03 | 3Q03 | | | | | |
| GE-11 | Alcatel | 1/10/03 | 1Q03 | | | | | |
| GE-21 | Alcatel | 3/11/03 | 2Q03 | | | | | |
| GE-3 (6-Mo Call Up) | Alcatel | 10/17/03 | 4Q03 | | | | | (Option) |
| GE-4 (6-Mo Call Up) | Alcatel | 12/15/03 | 1Q04 | | | | | (Option) |

NO CHANGE
CLASS 2 CHANGE

DASHBOARD

SUMMARY OF SUBCONTRACTOR PERFORMANCE
ALL PROGRAMS – AS \*\*/\*\*/\*\*

| | GE-6 | GE-8 | GE-XXX | GE-12 | GE-14 |
|---|---|---|---|---|---|
| SUBCONTRACTOR-1 | ↓ | | | | |
| SUBCONTRACTOR-2 | ↓ | | | | |
| SUBCONTRACTOR-3 | | | | | |
| SUBCONTRACTOR-4 | | | | ALERT | ALERT |
| SUBCONTRACTOR-5 | | | | | |
| SUBCONTRACTOR-6 | | | | | |
| SUBCONTRACTOR-7 | | | | | |
| SUBCONTRACTOR-8 | | | | | |
| SUBCONTRACTOR-9 | | | | | |

SUBCONTRACTOR EARLY ALERT

SATELLITE PROGRAM SUMMARY – GE8

| | PAYLOAD | TT&C | GNAC | POWER | POPULATION | NOTES |
|---|---|---|---|---|---|---|
| SUBCONTRACTOR-1 | | | | | | |
| SUBCONTRACTOR-2 | CLASS 2 CHANGE (SHORT DESCRIP OF CHANGE) | | | | | |
| SUBCONTRACTOR-3 | | | | | | |
| SUBCONTRACTOR-4 | | | | | | |

NO CHANGE
CLASS 2 CHANGE

ON LINE REVIEW & APPROVAL

PROJECT MANAGEMENT FOR COMPLEX CONSTRUCTION PROJECTS BY MONITORING SUBCONTRACTORS IN REAL TIME

BACKGROUND OF THE INVENTION

1. Field of the Invention

The present invention generally relates to a significant improvement in managing projects, in particular, construction projects. The invention can be applied to almost any construction project involving subcontractors. A typical application is construction of communications satellites. The more complex the project, the more likely this invention will prove effective.

This invention may be used for projects in which there is a contractor, in which, depending on the project, there might be a manufacturer which has contracted with the contractor, and, in either case, in which there will be a plurality of subcontractors who supply goods and services to the project. With this invention, the contractor easily monitors the status of each subcontractor with respect to completion of tasks that subcontractor is to perform. This monitoring is made possible through use of a real time computer program which generates a series of status displays on a display screen which can be a computer monitor or a special-purpose piece of hardware. The contractor can monitor the displays and become almost instantly aware of a variety of situations that may affect project completion. The contractor can, as a result, use the information in deciding how to keep the project on schedule.

2. Background Description

The current process for monitoring the status of subcontractors used by contractors and manufacturers remains highly labor intensive. This high labor intensity is especially prevalent for communications satellite constructors. The high labor intensity precludes close monitoring of all subcontractors, especially major subcontractors. In addition, the current process, often relying on nothing more advanced that notes scribbled on bits of paper, does not have an efficient means for identifying potential issues that may span multiple construction programs. In the example cited, the contractor may be having multiple satellites built for it. It is just too difficult to manually keep track of how changes in one construction project can affect another of the projects. The current process does not provide notification to appropriate contractor personnel. Inefficiencies in the current process do nothing to alleviate delays caused by subcontractors. Subcontractor delays become introduced into the manufacturing process. These delays result in delayed ship dates and could have effects on the quality of the spacecraft or other device being constructed.

SUMMARY OF THE INVENTION

It is, therefore, an object of the invention to provide a way for contractors and manufacturers to monitor how each subcontractor is faring with respect to providing the goods or services for which the subcontractor is obligated and how that subcontractor is meeting schedules. The information is supplied by a computer program operating in real time and with the information displayed on a monitor sometimes called an "electronic dashboard".

It is another object of the invention to provide the contractor and manufacturer, once made aware that a subcontractor might be experiencing or anticipating delays, to monitor other projects on which that subcontractor is working so that the contractor and manufacturer might act in time to affect the course of progress on the work.

BRIEF DESCRIPTION OF THE DRAWINGS

The foregoing and other objects, aspects, and advantages will be better understood from the following detailed description of a preferred embodiment of the invention with reference to the drawings, in which.

DETAILED DESCRIPTION OF A PREFERRED EMBODIMENT OF THE INVENTION

Figure 1:
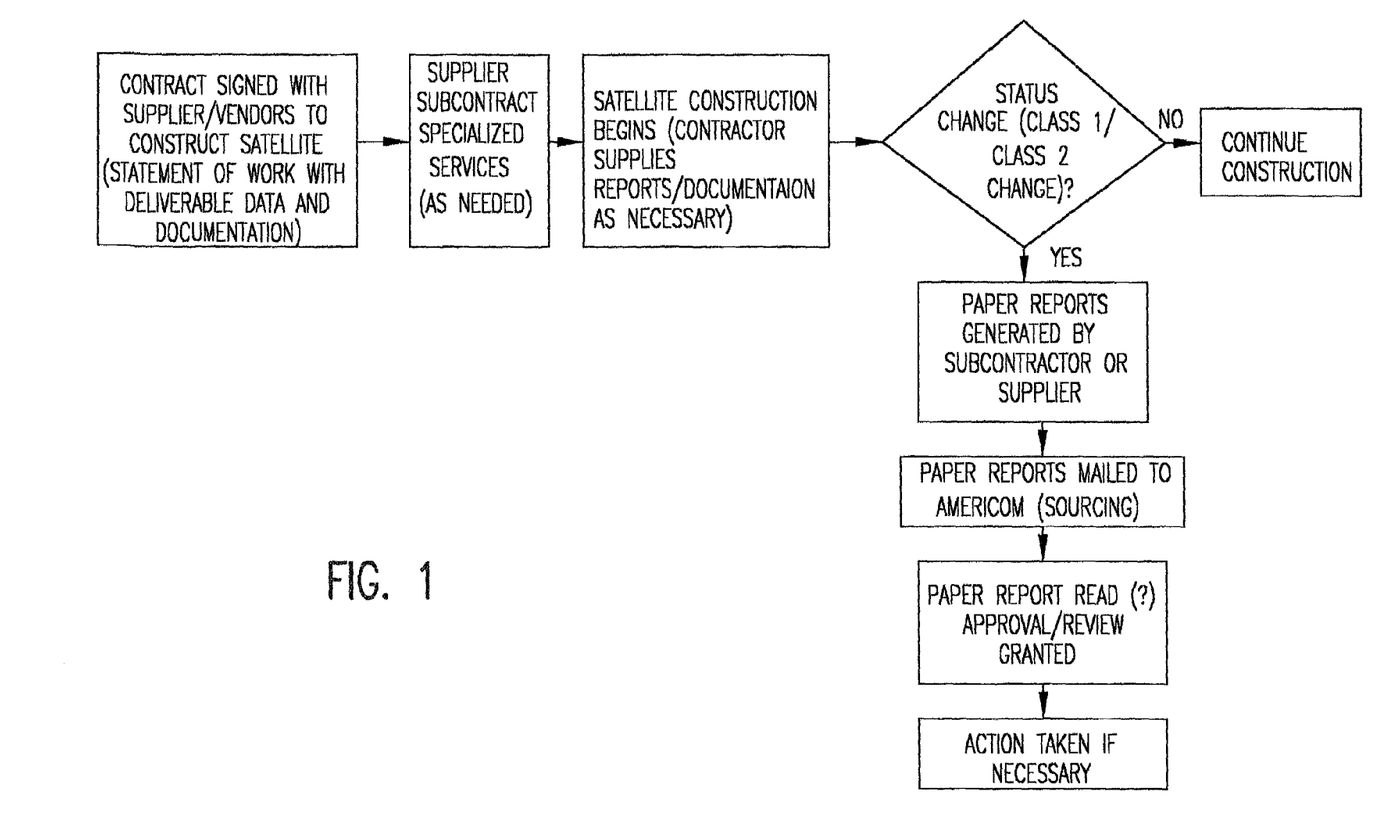
FIG. 1 is a diagram of the general process flow of typical current, paper-oriented systems for monitoring projects involving contractors and manufacturers where numbers of subcontractors provide various goods and services.
Figure 2:
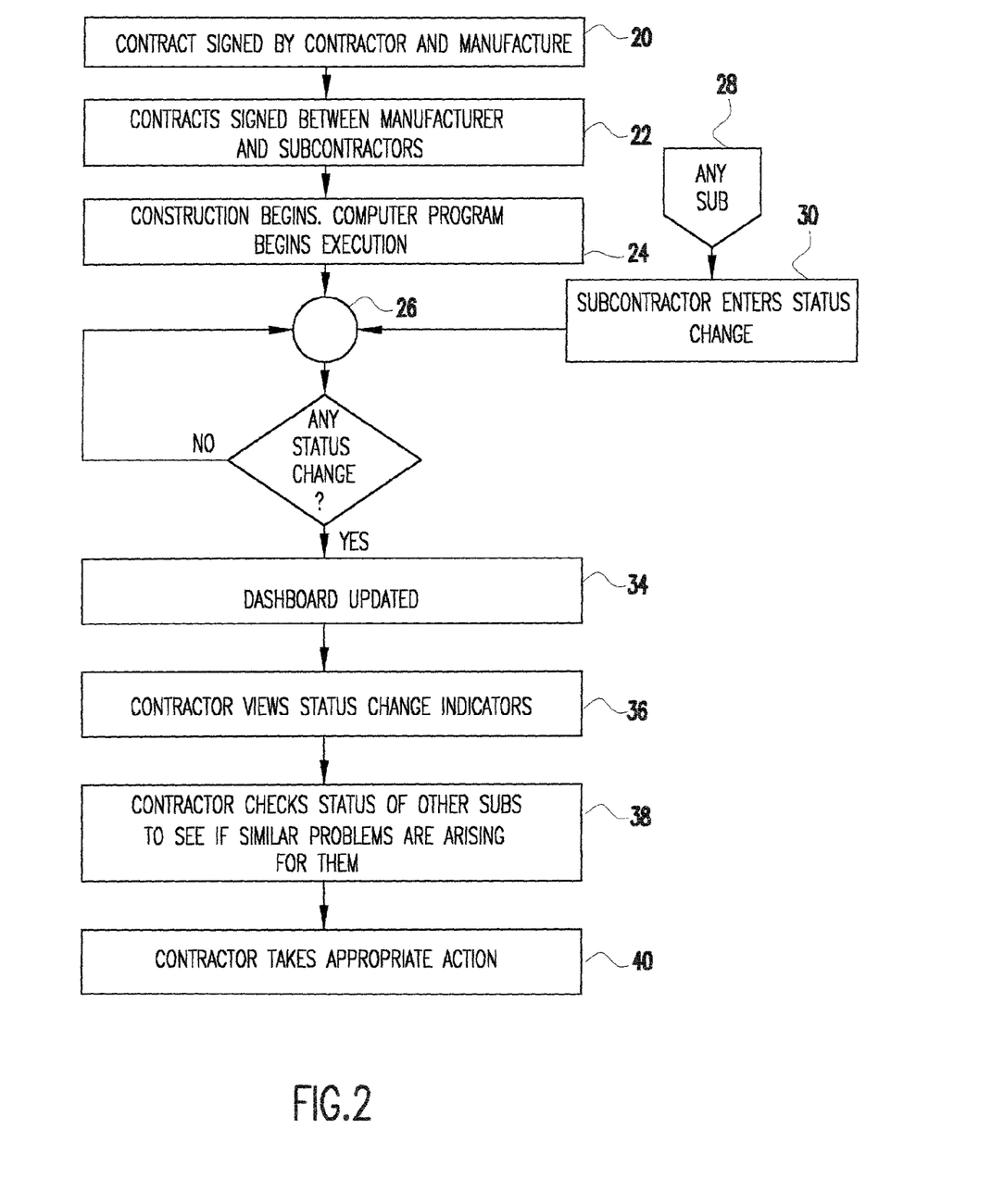
FIG. 2 is a diagram of the general process flow of the core portion of the proposed computer-implemented, real time system for monitoring projects involving contractors and manufacturers where numbers of subcontractors provide various goods and services.

The preferred embodiment of the invention assumes a situation in which there is a company, identified in this document as the "contractor", which contracts with a manufacturer of complex devices, in particular, communications satellites, to have one or more of these satellites manufactured. FIG. 2, 20. This manufacturer will contract with any number of subcontractors who provide a variety of specialized goods and services to the manufacturer. FIG. 2, 22.

At some time, construction on the satellite begins. FIG. 2, 24. A real time computer program then begins running on a computer system which computer system is under the control of the contractor. [In this context, we mean by "real time", a computer program that runs full time and provides results in a short period of time, usually so short a period of time that the results can affect some ongoing process.] For a major project, the earlier knowledge of potential delays is gained, the better the contractor can deal with the problems.

The computer program in the invention has already been programmed with the name of the satellite, the name of the satellite manufacturer, the name of each approved subcontractor, and the components or services that subcontractor will provide for the satellite.

Once construction of the satellite begins, designated personnel employed by the contractor will have access to a display device, the electronic "Dashboard", so the contractor may monitor the status of the construction project. These designated personnel might be Program Managers or Engineers responsible for overseeing the project.

From time to time, subcontractors may experience or anticipate delays due to changes in design or manufacture of a component or due to specification changes. The subcontractor will have access to the contractor's computer system via an Extra-Net site on the Internet. The subcontractor's messages will pass through security firewalls established by the contractor by using passwords. The subcontractor experiencing or anticipating delays will, via the computer system and by using a "click-box", inform the contractor of the delays by changing a status indicator from a "No-Change" status to a "Class-1" or a "Class-2" status. FIG. 2, 28, 30. [In the preferred embodiment, the system uses "click boxes", that is, screen displays that contain images of boxes with instructions or choices in them. The user moves a mouse pointer into the desired area in the box and clicks a mouse button.] A Class-1 status indicates a major change in anticipated schedules. A Class-2 status indicates a minor change. The subcontractor may also provide a brief summary description of the change, its implications to the process, and any proposed actions. All changes are saved in a database.

Figure 3:
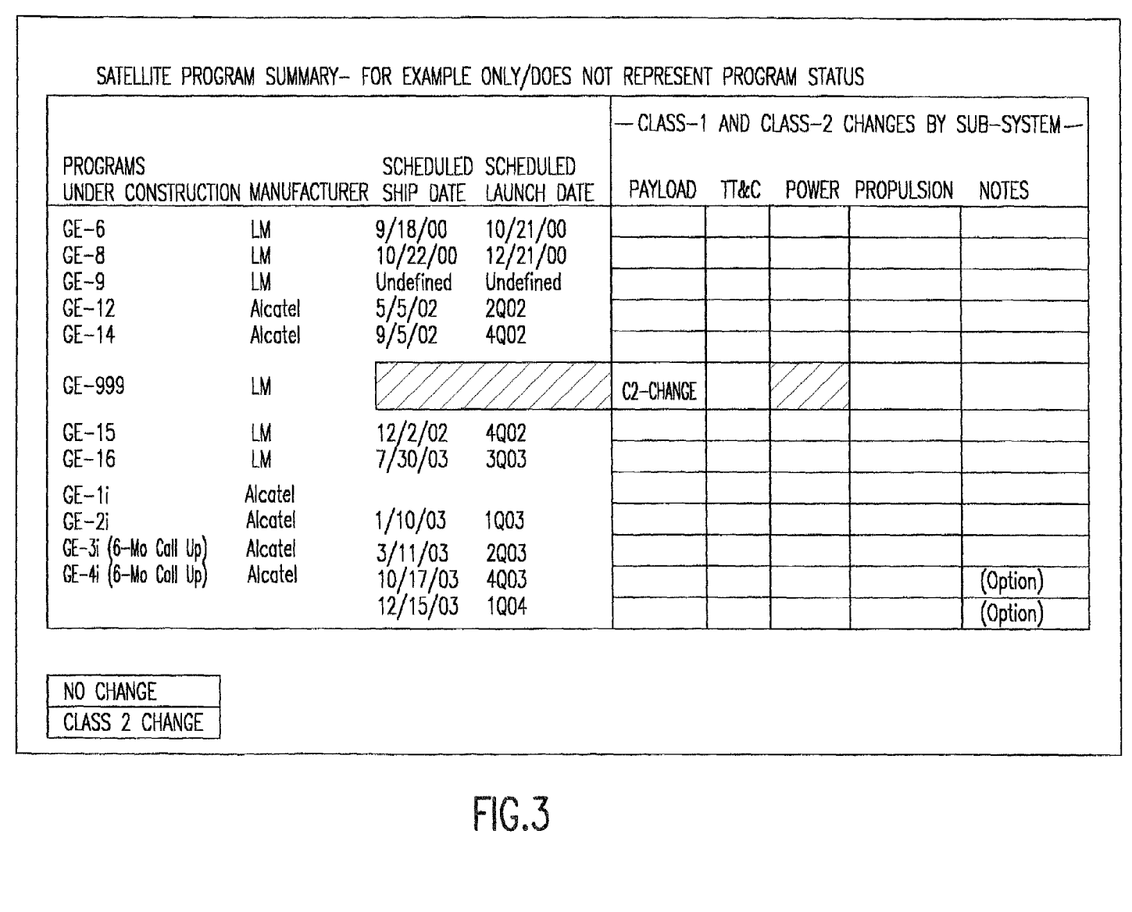
FIG. 3 is a screen shot of the main display, the "Dashboard".

The Dashboard display, FIG. 3, will be altered to reflect the change in status for this subcontractor. FIG. 2, 34. In the preferred embodiment, the portion of the Dashboard designated for each subcontractor will show green for each subcontractor with a No-Change status, yellow for a minor change (Class-2), and red for a major change (Class-1). Thus, the contractor personnel will easily notice any status changes and be instantly aware of the importance of each delay to the overall project. FIG. 2, 36. The status change should be posted to the system within three hours of the subcontractor's determining that the change is desirable. In addition to sending the status change to the Dashboard, a change notice is sent to a user-selected list of recipients.

Figure 4:
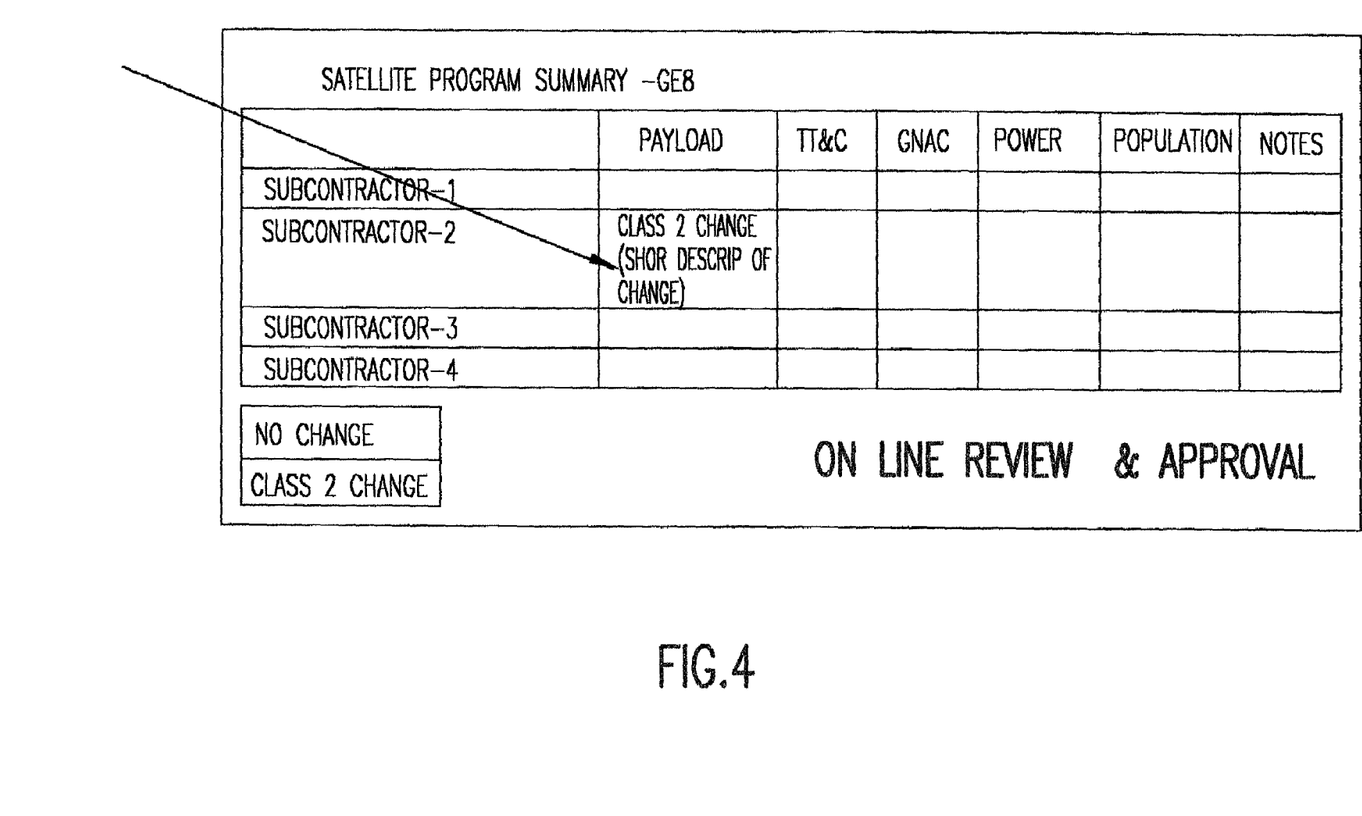
FIG. 4 is a screen shot of the Online Review and Approval Screen.

The Program Manager or responsible Engineer will review the change notice and, via the e-Subcontractor Management application, electronically approve or disapprove the change request. FIG. 4. In some cases, more information will be requested from the subcontractor. The choices to approve, disapprove, or request more information may be contained in a choice menu. Responses by the Program Manager or responsible Engineer are selected from an Approval Menu, one of the choice menus. An electronic copy of the response is sent to a user-selected list of recipients chosen from the contractor, the manufacturer, and even the subcontractor, if appropriate. The response is also recorded in the computer program.

If the Program Manager or responsible Engineer does not explicitly approve or disapprove the change notice or request, the e-Subcontractor Management system will leave the status of the change notice or request as "Open". Thereafter, an electronic reminder is sent to a predetermined distribution list every day until the change notice or the request is resolved. Once the change notice or request is resolved, the system will retain the change notice or request for on-line review and the Dashboard indicator will be changed to green.

The recipient of the change notice or request will take action as directed by the Program Manager or responsible Engineer. FIG. 2, 40. If no action is taken, the system may continually send reminders. The system may also be programmed with a set time after which reminders are no longer sent.

Figure 5:
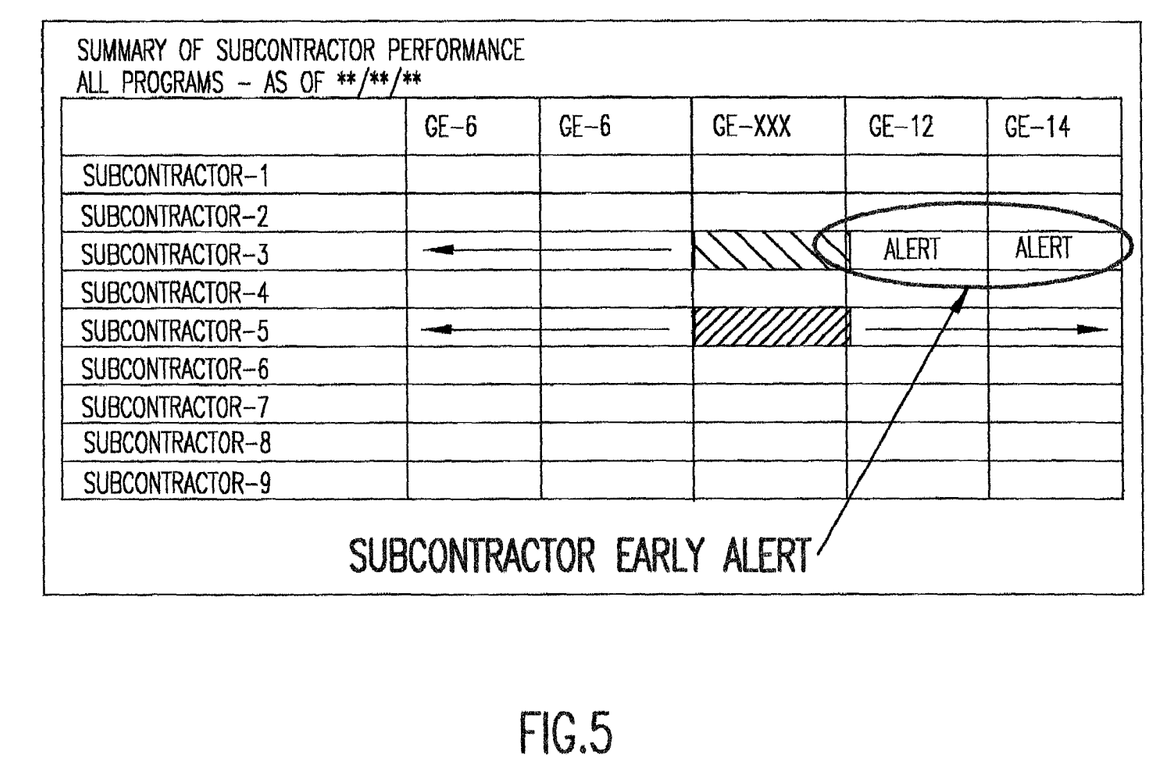
FIG. 5 is a screen shot of the Subcontractor Early Alert Screen.

The system and Dashboard give the contractor the additional capability of determining if a problem with one subcontractor is common to a number of subcontractors or if that subcontractor is having problems on more than one satellite. When a subcontractor reports a problem and the status indicator on the Dashboard changes from green to yellow or red, the contractor may click on the status indicator on the Dashboard. The Subcontractor Early Alert screen appears. FIG. 5. The contractor then knows how widespread are the problems affecting that subcontractor on that project.

Figure 6:
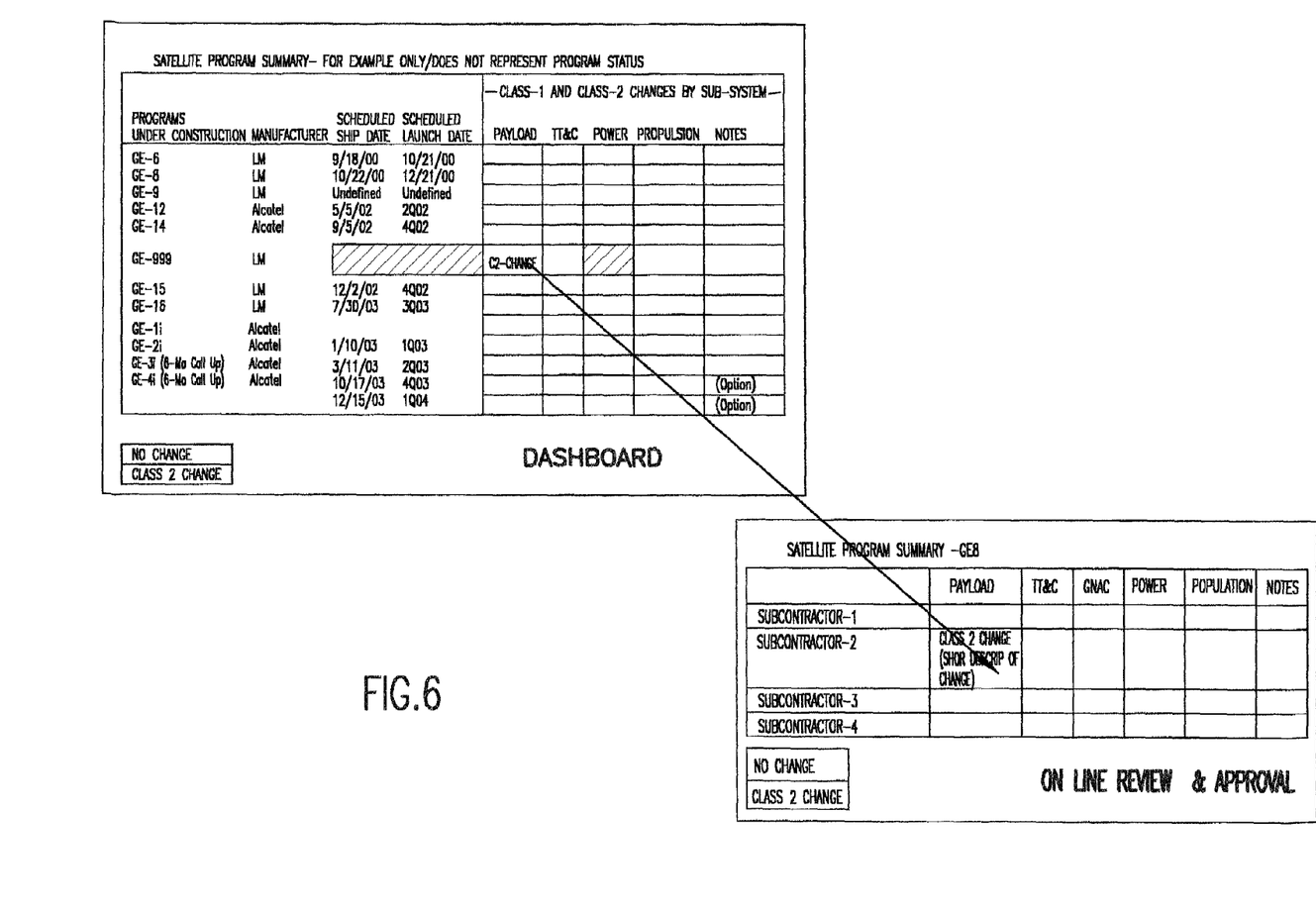
FIG. 6 shows how the Dashboard links to the Online Review and Approval Screen.
Figure 7:
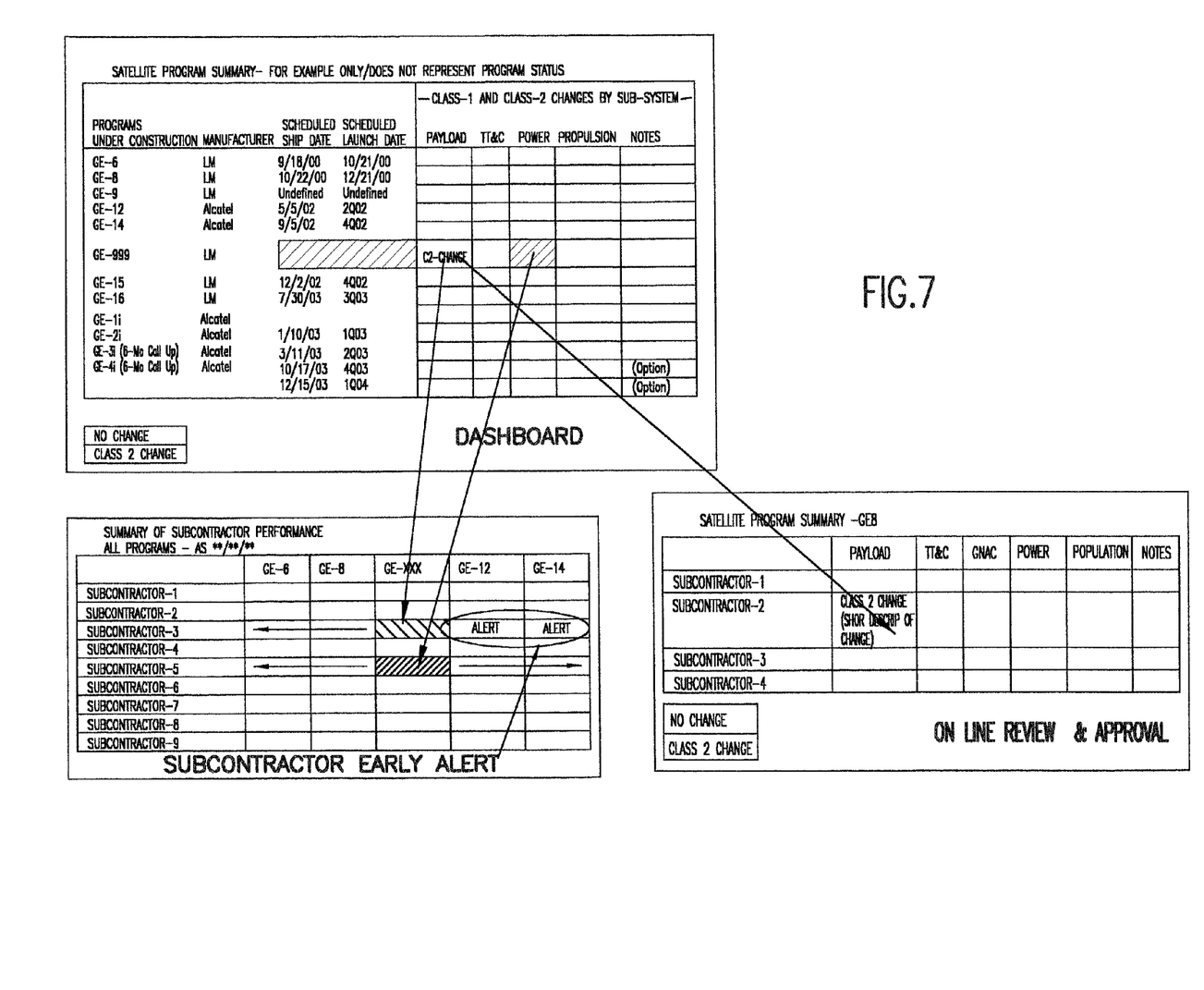
FIG. 7 shows how the Dashboard links to both the Online Review and Approval Screen and the Subcontractor Early Alert Screen.

The contractor can, by clicking on the appropriate locations on the Dashboard, move from the Dashboard to the On-Line Review and Approval screen, FIG. 6, or from the Dashboard to the Subcontractor Early Alert screen back to the Dashboard, then to the On-Line Review and Approval screen. This may be repeated as many times as may be required to solve the problem.

This process is repeated until the satellite construction program is complete.

In this document, actions that are said to be taken by a contractor, manufacturer, or subcontractor can be taken by persons representing the contractor, manufacturer, or subcontractor.

While the invention has been described in terms of its preferred embodiments, those skilled in the art will recognize that the invention can be practiced with modification within the spirit and scope of the appended claims.

We claim:

1. A method whereby a contractor uses displays generated by a computer to manage activities of a plurality of subcontractors of goods and services for one or more complex device commissioned by a manufacturer, the method comprising the following steps:
    executing a real-time computer program in the computer, the computer program providing a display having a location on said display for a status for each subcontractor, said status being drawn from a pre-defined set and identifying a change, wherein the pre-defined set of status changes are designated to be of different classes;
    the computer program changing a visible attribute of the status location assigned to a particular subcontractor whenever that subcontractor accesses the computer and reports a change in status by selecting from said predefined set;
    the computer program providing a second display showing all instances of the status for said subcontractor; and
    the computer program providing a third display permitting, for each status change, on-line review and approval by a manager of the contractor of said change in status by said subcontractor;
    wherein persons selected by the contractor are sent a reminder when there is a status change for which no action has been reported by the manager until the manager either takes an action or resolves the status change, wherein resolving the status change is indicated by a change of color of a status indicator on the display, and wherein the status change is resolved after a passage of a contractor-selected period of time.

2. The method of claim 1 wherein the device is a satellite.

3. The method of claim 1 wherein the computer is accessed Through an extranet site via the internet.

4. The method of claim 1 wherein the display is an electronic dashboard.

5. The method of claim 1 wherein the report of change is made by using a click box.

6. The method of claim 1 wherein an electronic notice of change is sent to a contractor-selected list of recipients whenever any change is reported.

7. The method of claim 1 wherein said third display for on-line review and approval by a manager of the contractor includes choices for a) approval or disapproval, b) requesting more information, or c) making no decision.

8. The method of claim 7 wherein the choices are contained on a computerized menu.

9. The method of claim 1 wherein the classes are designated as "No Change", "Minor Change", and "Major Change".

10. The method of claim 1 wherein each class is indicated on the display by a different color different from the color used to indicate any other change.

11. The method of claim 10 wherein green indicates the "No Change" class, yellow indicates the "Minor Change" class, and red indicates the "Major Change" class.

12. The method of claim 1 wherein all changes are recorded in database.

13. The method of claim 1 wherein the reminders are made daily.

14. The method of claim 1 further comprising the step of providing system security to ensure that a particular subcontractor can load only that data and view that information which pertains to the devices being constructed or services being provided by that subcontractor.

15. The method of claim 14 providing system security by password protection.

* * * * *